US008744001B2

(12) United States Patent
Matsuoka (10) Patent No.: US 8,744,001 B2
(45) Date of Patent: Jun. 3, 2014

(54) MULTIMODE TRANSMITTER APPARATUS (75) Inventor: Akihiko Matsuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/820,832

(22) PCT Filed: Sep. 1, 2011

(86) PCT No.: PCT/JP2011/004916
§ 371 (c)(1),
(2), (4) Date: Mar. 5, 2013

(87) PCT Pub. No.: WO2012/032746
PCT Pub. Date: Mar. 15, 2012

(65) Prior Publication Data
US 2013/0170577 A1   Jul. 4, 2013

(30) Foreign Application Priority Data
Sep. 8, 2010   (JP) ................................. 2010-200918

(51) Int. Cl.
*H04L 27/00*   (2006.01)
(52) U.S. Cl.
USPC ....................................................... 375/295
(58) Field of Classification Search
CPC ............. H04B 1/04; H04B 2001/0491; H04L 27/0008
USPC ....................................................... 375/295
See application file for complete search history.

(56) References Cited

U.S. PATENT DOCUMENTS

| 7,209,720 | B2* | 4/2007 | Balasubramaniyan et al. | 455/127.5 |
| 7,277,497 | B2* | 10/2007 | Hietala et al. | 375/302 |
| 7,394,869 | B2* | 7/2008 | Jensen et al. | 375/302 |
| 7,474,708 | B1* | 1/2009 | Khlat et al. | 375/296 |
| 2002/0106032 | A1* | 8/2002 | Navarro et al. | 375/259 |
| 2004/0208157 | A1* | 10/2004 | Sander et al. | 370/345 |
| 2004/0218683 | A1* | 11/2004 | Batra et al. | 375/261 |

FOREIGN PATENT DOCUMENTS

| JP | 08-032540 A | 2/1996 |
| JP | 08-0102766 A | 4/1996 |
| JP | 08-107426 A | 4/1996 |
| JP | 2000-004195 A | 1/2000 |
| JP | 2008-011030 A | 1/2008 |

OTHER PUBLICATIONS

International Search Report for PCT/JP2011/004916 dated Oct. 11, 2011.

* cited by examiner

Primary Examiner — Juan A Torres
(74) Attorney, Agent, or Firm — Pearne & Gordon LLP (57) ABSTRACT

Provided is a multimode transmitter apparatus that, in a case of using different paths to process modulated signals, can suppress the signal overlapping or loss that would occur during a path switching. In the apparatus, a baseband modulating unit (110), which supports a plurality of modulation schemes using different modulation bandwidths, outputs either first modulated signals or second modulated signals. An LPF (130-1) and an LPF (130-2), which have delay amounts $\Delta td1$ and $\Delta td2$, perform signal processings of the first and second modulated signals, respectively. A timing control unit (160) sets the modulation schemes and the switching timings of the modulation schemes. The timing control unit (160) sets, on the basis of the switching timings and the delay amounts $\Delta td1$ and $\Delta td2$, the switching timings of a modulated signal selecting switch (120) and a signal processing delay adjusting switch (140) to be different from each other.

14 Claims, 7 Drawing Sheets

MULTIMODE TRANSMITTER APPARATUS

TECHNICAL FIELD

The present invention relates to a multimode transmitter apparatus which performs signal processing on a plurality of signals undergoing digital signal processing, in a plurality of paths which have different delay amounts.

BACKGROUND ART

Currently, a system is under study in which pluralities of modulation schemes, modulation bandwidths, and user channels are handled by an identical signal processing circuit, with progress of diversification and advanced features of a wireless communication system. A technique which combines a digital signal processing circuit and a switch which switches signal-processing paths is proposed as one method of such schemes.

A conventional multimode transmitter apparatus has been provided, which included two modulating sections modulating identical signals, and a plurality of transmitting sections including different paths and antennas (for example, refer to Patent Literature 1). The apparatus described in Patent Literature 1 connects these two modulating sections and a plurality of transmitting sections by a selector, and adjusts frame timing of a modulating section according to the delay amount of the transmitting section. Accordingly, the multimode transmitter apparatus described in Patent Literature 1 has an effect which maintains the delay amount of the overall apparatus constant, as a function.

Figure 1:
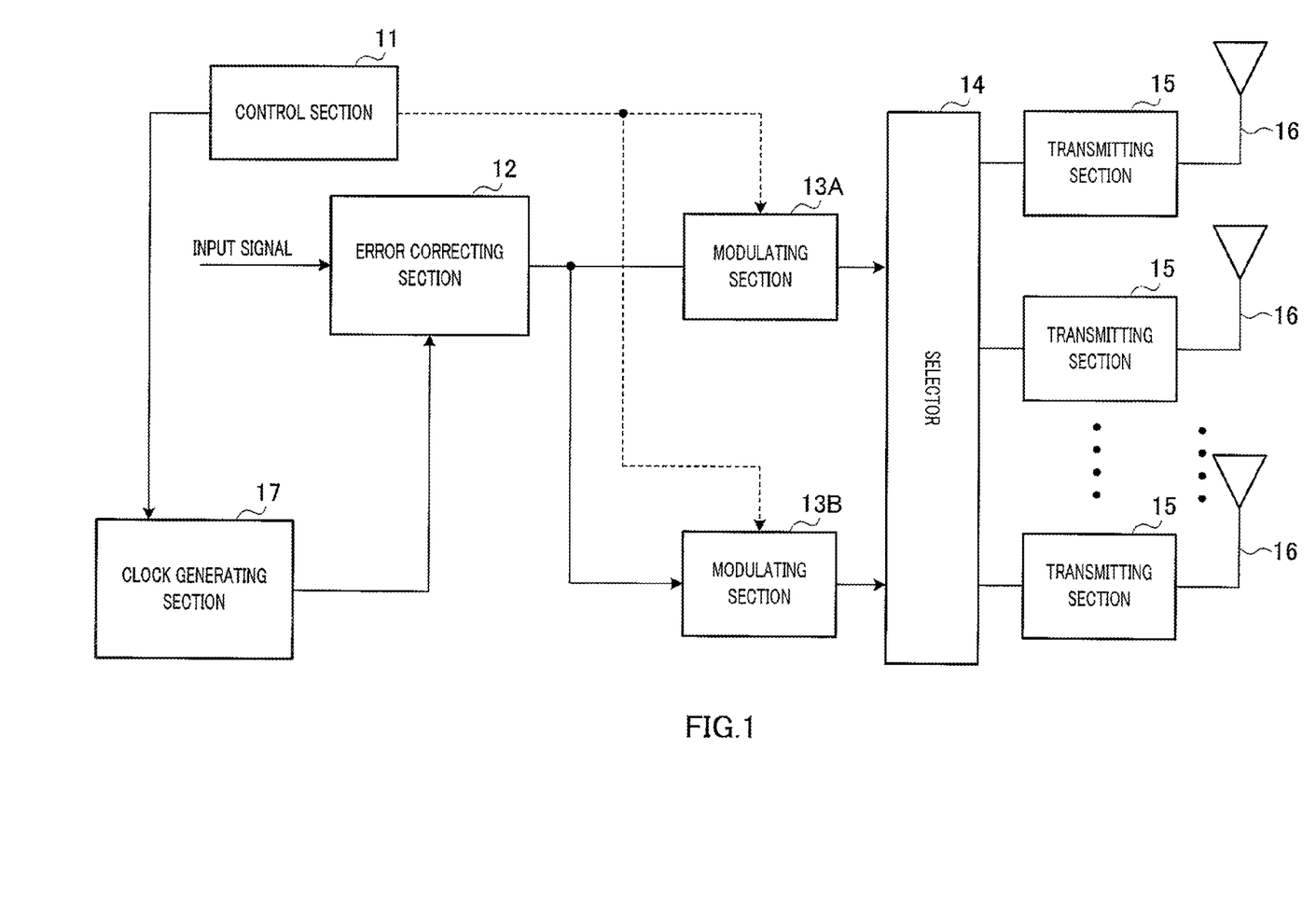
FIG. 1 is a schematic diagram of a conventional multimode transmitter apparatus.

FIG. 1 illustrates the conventional multimode transmitter apparatus described in Patent Literature 1.

With the conventional multimode transmitter apparatus illustrated in FIG. 1, in the case where a mobile station performs a soft handoff, identical signals generated in a base station pass through modulating section 13A and modulating section 13B, and are transmitted from two antennas through different paths. At this time, control section 11 adjusts a delay, due to a difference of signal paths, between a digital circuit provided in previous stage of selector 14, and an analog circuit provided in a subsequent stage of selector 14. Control section 11 causes clock generating section 17 to generate a frame clock considering signal delay, and adjusts signal supply timing according to signal paths to modulating sections 13A and 13B.

CITATION LIST

Patent Literature

PTL 1
Japanese Patent Application Laid-Open No. 2000-4195 (FIG. 2)

SUMMARY OF INVENTION

Technical Problem

However, according to the above-mentioned conventional configuration, since respective transmitting sections provided in the subsequent stage of a selector operate independently, duplication and a loss of signals may be occurred at the time of switching the path, in cases where there is a difference of delays between paths of respective transmitting sections.

A purpose of the present invention is to provide a multimode transmitter apparatus which can suppress a duplication and a loss of signals, which may be occurred at the time of path switching, in the case where signal processing is performed in different paths.

Solution to Problem

One aspect of a multimode transmitter apparatus of the present invention includes: a modulating section that is compatible with a plurality of modulation schemes different each other and generates one of a first modulation signal corresponding to a first modulation scheme and a second modulation signal corresponding to a second modulation scheme; a first signal processing section that has a first delay amount and performs signal processing on the first modulation signal; a second signal processing section that has a second delay amount larger than the first delay amount and performs signal processing on the second modulation signal; a transmitting section that transmits the first modulation signal and the second modulation signal, on which the signal processing have been performed; a first switch that is provided between the modulating section, and the first and the second signal processing sections, and outputs the modulation signal to one of the first and the second signal processing sections; a second switch that is provided between the first and the second signal processing sections, and the transmitting section, and outputs one of the first modulation signal and the second modulation signal, on which the signal processing has been performed, to the transmitting section; and a control section that sets a modulation scheme used for generating the modulation signal in the modulating section, sets switching timing of the first switch based on the first delay amount and the second delay amount, and sets switching timing of the second switch different from the switching timing of the first switch based on at least the switching timing of the first switch and the first delay amount.

According to such configuration, it is possible to avoid a duplication of the first modulation signal and the second modulation signal. Furthermore, when switching the path from a path which passes the second signal processing section with larger delay amount to a path which passes the first signal processing section with smaller delay amount, the loss of the signal can be avoided.

One aspect of a multimode transmitter apparatus of the present invention includes: a modulating section that is compatible with a plurality of modulation schemes different each other and generates a first modulation signal corresponding to a first modulation scheme and a second modulation signal corresponding to a second modulation scheme in parallel, and outputs at least one of the first and the second modulation signals; a first signal processing section that has a first delay amount and performs signal processing on the first modulation signal; a second signal processing section that has a second delay amount larger than the first delay amount and performs signal processing on the second modulation signal; a transmitting section that transmits the first modulation signal and the second modulation signal, on which the signal processing have been performed; a switch that is provided between the first and the second signal processing sections, and the transmitting section, and outputs one of the first modulation signal and the second modulation signal, on which the signal processing have been performed, to the transmitting section; and a control section that sets a modulation scheme used for generating the modulation signal in the modulating section, sets modulation signal output number change timing at which an output of the modulating section is switched from one of the first modulation signal and the second modulation signal to both of the first modulation signal and the second modulation signal based on the first delay amount and the second delay amount, and sets switching timing of the switch based on one of the first delay amount and the second delay amount, and the modulation signal output number change timing.

According to such configuration, when switching the path from a path which passes the first signal processing section with smaller delay amount to a path which passes the second signal processing section with larger delay amount, the loss of the signal can be avoided.

Advantageous Effects of Invention

According to the present invention, it is possible to suppress a duplication and a loss of signals, which occur at the time of path switching, in the case where signal processing is performed in different paths. As a result, a ratio of common circuit part in a transmission modulation circuit dealing with a plurality of modulation schemes can be increased, and a multimode transmitter apparatus with higher circuit usage efficiency can be provided.

DESCRIPTION OF EMBODIMENTS

Hereinafter, embodiments of the present invention will be described in detail with reference to drawings.

Embodiment 1

Figure 2:
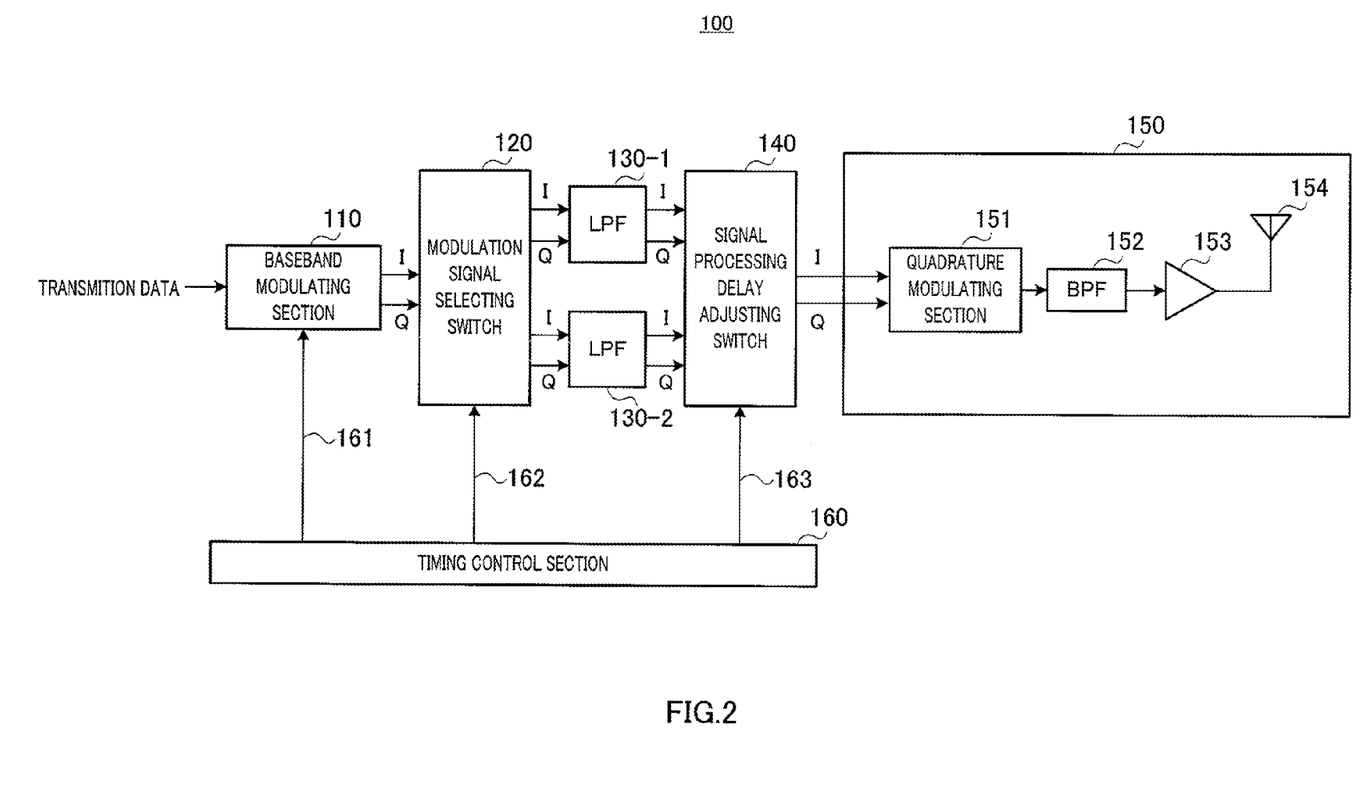
FIG. 2 is a schematic diagram of a multimode transmitter apparatus according to Embodiment 1 of the present invention.

FIG. 2 is a block diagram illustrating a principal part configuration of a multimode transmitter apparatus according to Embodiment 1 of the present invention.

Multimode transmitter apparatus 100 illustrated in FIG. 2 is compatible with modulation schemes of modulation scheme 1 and modulation scheme 2. The present embodiment describes a case where the modulation bandwidth of modulation scheme 1 is wider than the modulation bandwidth of modulation scheme 2, as an example. For example, modulation scheme 1 is UMTS (Universal Mobile Telephone Service) modulation scheme. Moreover, modulation scheme 2 is GSM (Global System for Mobile Communications) modulation scheme. In this case, the modulation bandwidth of modulation scheme 1 is wider than the modulation bandwidth of modulation scheme 2.

Multimode transmitter apparatus 100 illustrated in FIG. 2 includes baseband modulating section 110, modulation signal selecting switch 120, low pass filters (LPF) 130-1, 130-2 which are signal processing sections, signal processing delay adjusting switch 140, radio transmission processing section 150, and timing control section 160.

Baseband modulating section 110 is compatible with a plurality of modulation schemes (modulation scheme 1 and modulation scheme 2). Baseband modulating section 110 modulates transmission data, and generates baseband signals (I/Q signals), using the modulation scheme (modulation scheme 1 or modulation scheme 2) in accordance with control signal 161 output from timing control section 160 as described below. Hereinafter, the baseband signal obtained by modulating the transmission data using modulation scheme 1 is referred to as "baseband signal 1." Moreover, the baseband signal obtained by modulating the transmission data using modulation scheme 2 is referred to as "baseband signal 2." Baseband modulating section 110 outputs one of baseband signal 1 and baseband signal 2 to modulation signal selecting switch 120.

Modulation signal selecting switch 120 switches an output destination of the baseband signal to one of LPF 130-1 and LPF 130-2 which are described below, based on control signal 162 output from timing control section 160 as described below. Hereinafter, a path which passes through LPF 130-1 is referred to as path 1, and a path which passes through LPF 130-2 is referred to as path 2.

LPF 130-1 limits a band of baseband signal 1 corresponding to modulation scheme 1 as the signal processing, and outputs baseband signal 1 after the band limitation to signal processing delay adjusting switch 140. LPF 130-1 has a frequency characteristic corresponding to modulation scheme 1.

LPF 130-2 limits a band of baseband signal 2 corresponding to modulation scheme 2 as the signal processing, and outputs baseband signal 2 after the band limitation to signal processing delay adjusting switch 140. LPF 130-2 has a frequency characteristic corresponding to modulation scheme 2.

In other words, LPF 130-1 and LPF 130-2 have different passband characteristics. Therefore, a delay amount of LPF 130-1 is different from a delay amount of LPF 130-2. As mentioned above, the modulation bandwidth of modulation scheme 1 is wider than the modulation bandwidth of modulation scheme 2. Therefore, delay amount $\Delta td1$ of LPF 130-1 which has a frequency characteristic corresponding to modulation scheme 1 is smaller than delay amount $\Delta td2$ of LPF 130-2 which has a frequency characteristic corresponding to modulation scheme 2.

Signal processing delay adjusting switch 140 is provided at a subsequent stage of LPF 130-1 and LPF 130-2. Signal processing delay adjusting switch 140 selects one of baseband signal 1 and baseband signal 2, which is band-limited by LPF 130-1 or LPF 130-2, based on control signal 163. In other words, signal processing delay adjusting switch 140 switches an input source of quadrature modulating section 151 to one of LPF 130-1 and LPF 130-2 according to control signal 163. Then, signal processing delay adjusting switch 140 outputs the baseband signal which is band-limited by selected LPF 130-1 or LPF 130-2 to radio transmission processing section 150.

Radio transmission processing section 150 includes quadrature modulating section 151, band pass filter (BPF) 152, power amplifier 153, and antenna 154.

Quadrature modulating section 151 performs a quadrature modulation on the baseband signal to generate a modulation signal, and up-converts the modulation signal to RF band to generate a transmission signal. Quadrature modulating section 151 outputs the transmission signal to BPF 152.

BPF 152 performs the band limitation on the transmission signal, and outputs the band-limited transmission signal to power amplifier 153.

Power amplifier 153 amplifies the output power of the band-limited transmission signal to desired power. Then, power amplifier 153 transmits the amplified transmission signal through transmission antenna 154.

In this way, radio transmission processing section 150 performs a radio transmission process on the baseband signal output from signal processing delay adjusting switch 140. Then, radio transmission processing section 150 transmits the transmission signal generated by such radio transmission process.

Timing control section 160 controls the modulation scheme of baseband modulating section 110, an operation of modulation signal selecting switch 120, and an operation of signal processing delay adjusting switch 140.

Specifically, timing control section 160 outputs control signal 161 which indicates the modulation scheme and switching timing of the modulation scheme to baseband modulating section 110. Control signal 161 is described below.

Moreover, timing control section 160 outputs control signal 162, which indicates a switching (selection) of a path and switching (selection) timing of the path, to modulation signal selecting switch 120. Control signal 162 is described below.

Furthermore, timing control section 160 outputs control signal 163, which indicates a switching of the input source of quadrature modulating section 151 and switching timing of the input source, to signal processing delay adjusting switch 140. Control signal 163 is described below.

An operation of multimode transmitter apparatus 100 constituted as mentioned above will be described.

Figure 3:
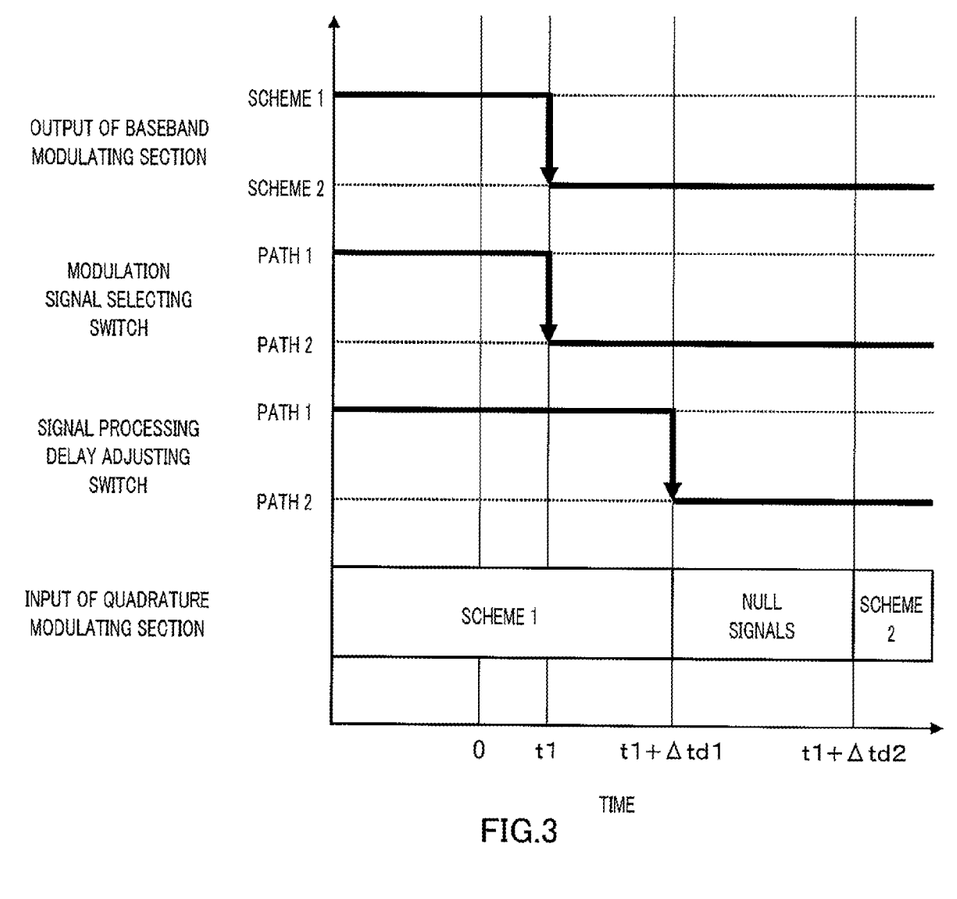
FIG. 3 is a control timing chart of the multimode transmitter apparatus according to Embodiment 1.
Figure 4:
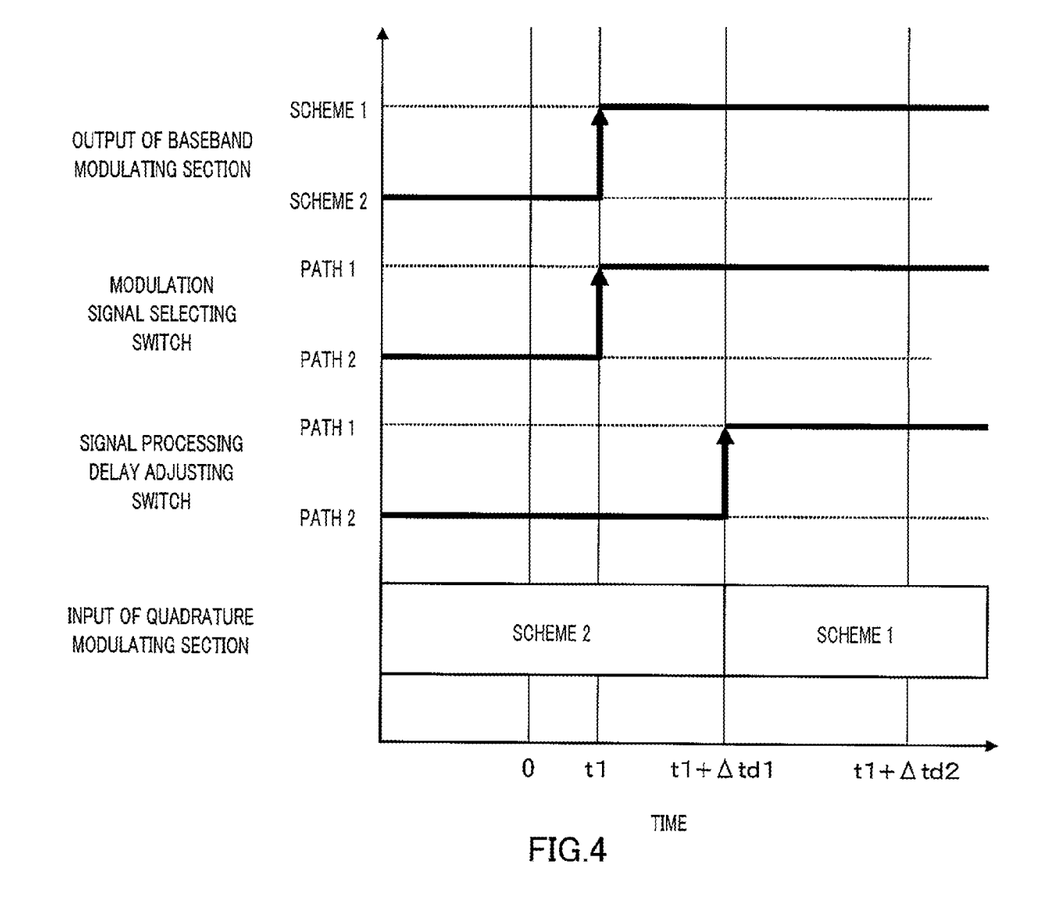
FIG. 4 is a control timing chart of the multimode transmitter apparatus according to Embodiment 1.

FIG. 3 and FIG. 4 are drawings illustrating input and output signals of each part of multimode transmitter apparatus 100 according to the present embodiment.

FIG. 3 and FIG. 4 illustrate an output of baseband modulating section 110, a path selected by modulation signal selecting switch 120, a path selected by signal processing delay adjusting switch 140, and the modulation signal input into quadrature modulating section 151. As mentioned above, in FIG. 3 and FIG. 4, path 1 indicates the path along which the baseband signal passes through LPF 130-1, and path 2 indicates the path along which the baseband signal passes through LPF 130-2.

FIG. 3 illustrates an exemplary case of changing the modulation scheme from modulation scheme 1 to modulation scheme 2, and FIG. 4 illustrates an exemplary ease of changing the modulation scheme from modulation scheme 2 to modulation scheme 1.

In this embodiment, it is assumed that baseband modulating section 110 is compatible with two kinds of modulation schemes, that is, the UMTS modulation scheme (hereinafter, modulation scheme 1) and the GSM modulation scheme (hereinafter, modulation scheme 2), as a specific example. LPF 130-1 has a frequency characteristic corresponding to modulation scheme 1, and LPF 130-2 has a frequency characteristic corresponding to modulation scheme 2. Hereinafter, an operation in this case will be described.

First, a control method in a case of switching the modulation scheme from modulation scheme 1 to modulation scheme 2 will be described with reference to FIG. 3. As mentioned above, since the modulation bandwidth of modulation scheme 1 is wider than the modulation bandwidth of modulation scheme 2, delay amount $\Delta td1$ of LPF 130-1 is smaller than delay amount $\Delta td2$ of LPF 130-2.

Timing control section 160 outputs control signal 161 level of which has been changed to Low from High to baseband modulating section 110, when switching the modulation scheme from modulation scheme 1 to modulation scheme 2.

FIG. 3 illustrates an example in which control signal 161 level of which is changed to Low from High at time 0 (hereinafter, referred to as "reference time") is output to baseband modulating section 110 from timing control section 160.

Baseband modulating section 110 switches the modulation scheme from modulation scheme 1 to modulation scheme 2 at time 0 (reference time) when the level of control signal 161 changes from High to Low. Baseband modulating section 110 generates baseband signal 2 by modulating the transmission data using modulation scheme 2, and outputs generated baseband signal 2 to modulation signal selecting switch 120.

In the present embodiment, the period required for baseband modulating section 110 from when receiving a switching instruction of the modulation scheme at time 0 (hereinafter, referred to as "switching instruction") till when outputting generated baseband signal 2 to modulation signal selecting switch 120 is represented by t1. In other words, the delay amount of baseband modulating section 110 is t1. Hereinafter, this delay amount is referred to as "switching delay amount t1." Baseband modulating section 110, when using modulation scheme 1, modulates the transmission data at the timing in consideration of a difference ($\Delta td2 - \Delta td1$) of the delay amounts of LPF 130-1 and LPF 130-2, in comparison to the case where modulation scheme 2 is used. Therefore, the baseband signal after the switching is output from baseband modulating section 110 at time t1 at which the switching delay amount t1 has elapsed from time 0 at which the switching instruction is received (hereinafter, simply referred to as "time 0").

In the present embodiment, in both cases of using modulation scheme 1 and using modulation scheme 2, baseband modulating section 110 adjusts the modulation timing in advance so that the baseband signal modulated using a modulation scheme after switching is output at time t1.

In this way, in the case where baseband modulating section 110 switches the modulation scheme from modulation scheme 1 to modulation scheme 2 at time 0, baseband signal 2 is output to modulation signal selecting switch 120 at time t1. Moreover, before time t1, baseband signal 1 is output to modulation signal selecting switch 120.

Next, timing control section 160 outputs control signal 162 level of which has been changed to Low from High to modulation signal selecting switch 120, in order to output baseband signal 2 to LPF 130-2. Timing control section 160 outputs control signal 162 level of which is changed from High to Low at time t1, to modulation signal selecting switch 120. As mentioned above, time t1 indicates a time when the switching delay amount t1 elapses from time 0.

Modulation signal selecting switch 120 switches an output destination of the baseband signal from LPF 130-1 to LPF 130-2 at time t1 when the level of control signal 162 changes from High to Low. Accordingly, after time t1, baseband signal 2 is output to LPF 130-2, and passes through path 2. Besides, between time 0 and time t1, baseband signal 1 is output to LPF 130-1, and passes through path 1.

In this way, timing control section 160 controls the output destination of baseband modulating section 110 at time 11 when switching delay amount t1 has elapsed. Specifically, timing control section 160 switches the output destination of the baseband signal generated by baseband modulating section 110 to LPF 130-2 from LPF 130-1. Accordingly, baseband signal 2 is made to be output to LPF 130-2 at time t1. Then, baseband signal 2 is band-limited by LPF 130-2.

Next, timing control section 160 outputs control signal 163 level of which has been changed to Low from High to signal processing delay adjusting switch 140, in order to output baseband signal 2 after the band limitation to quadrature modulating section 151. Timing control section 160 outputs control signal 163 level of which changes from High at time t2, to Low to signal processing delay adjusting switch 140. Here, time t2 represents the time (t2=t1+Δtd1) when the period of delay amount Δtd1 has elapsed from time t1. Delay amount Δtd1 is a period from when baseband signal 1 is input into LPF 130-1 till when baseband signal 1 is output from LPF 130-1. In other words, delay amount Δtd1 is a delay amount in LPF 130-1, which serves as a signal processing section.

Signal processing delay adjusting switch 140 switches the input source of quadrature modulating section 151 from LPF 130-1 to LPF 130-2 at time t2 (=t1+Δtd1) when the level of control signal 163 changes from High to Low. In other words, baseband signal 2 which is band-limited by LPF 130-2 is output to quadrature modulating section 151 after time t2 (=t1+Δtd1).

Besides, between time 0 and time t2, signal processing delay adjusting switch 140 sets LPF 130-1 as the input source of quadrature modulating section 151. Accordingly, baseband signal 1 which is band-limited by LPF 130-1 is output to quadrature modulating section 151 during this period.

In this way, signal processing delay adjusting switch 140 switches the input source of quadrature modulating section 151 from LPF 130-1 to LPF 130-2 at time t2. A time when baseband signal 2 which is band-limited by LPF 130-2 reaches quadrature modulating section 151 is time t3 (=t1+Δtd2). Here, Δtd2 is a delay amount of LPF 130-2, which serves as a signal processing section. In other words, null signals are input to quadrature modulating section 151 from LPF 130-2 from time t2 till time t3. Then, baseband signal 2 after the band limitation is input to quadrature modulating section 151 from LPF 130-2 after time t3 (refer to FIG. 3).

In this way, timing control section 160 switches the input source of quadrature modulating section 151 from LPF 130-1 to LPF 130-2 at time t2 (=t1+Δtd1). Specifically, timing control section 160 outputs control signal 163 level of which changes from High to Low at time t2 (=t1+Δtd1), to signal processing delay adjusting switch 140. Time t2 is the time in accordance with delay amount Δtd1 of LPF 130-1.

Signal processing delay adjusting switch 140 switches the input source of quadrature modulating section 151 from LPF 130-1 to LPF 130-2 at time t2 (=t1+Δtd1). In this way, signal processing delay adjusting switch 140 switches the input source of quadrature modulating section 151 to LPF 130-2 corresponding to modulation scheme 2 which is used after the switching, at time t2 (=t1+Δtd1) based on time 0, time t1, and delay amount Δtd1. Time 0 is switching time of the modulation scheme, time t1 is switching time of modulation signal selecting switch 120, and delay amount Δtd1 is a smaller one among delay amounts Δtd1 and Δtd2.

Accordingly, in the case where the modulation scheme changes from modulation scheme 1 to modulation scheme 2, it is possible to avoid a duplicative input of baseband signal 1 and baseband signal 2 to quadrature modulating section 151. As mentioned above, modulation scheme 2 is the modulation scheme of which the modulation bandwidth is narrower than the modulation bandwidth of modulation scheme 1.

In the above-mentioned description, a case is described in which timing control section 160 outputs control signal 163 level of which changes to Low from High at time t2 (=t1+Δtd1) to signal processing delay adjusting switch 140, but it is not limited to this manner. As mentioned above, the null signals are input into quadrature modulating section 151 from time t2 till time t3. Therefore, timing control section 160 may output control signal 163 level of which changes from High to Low between time t2 (=t1+Δtd1) and time t3, to signal processing delay adjusting switch 140.

The baseband signal output from signal processing delay adjusting switch 140 is up-converted to be the transmission signal with RF band by quadrature modulating section 151, and is band-limited by BPF 152. After that, the up-converted and band-limited signal is amplified so that the power of the signal becomes desired output power by power amplifier 153, and is transmitted from transmission antenna 154.

Next, a control method in a case of switching the modulation scheme from modulation scheme 2 to modulation scheme 1 will be described with reference to FIG. 4.

Timing control section 160 outputs control signal 161 level of which has been changed to High from Low, to baseband modulating section 110, when switching the modulation scheme from modulation scheme 2 to modulation scheme 1. FIG. 4 illustrates an example in which control signal 161 level of which is changed to High from Low at time 0 (hereinafter, referred to as "reference time") is output to baseband modulating section 110 from timing control section 160.

Baseband modulating section 110 switches the modulation scheme from modulation scheme 2 to modulation scheme 1 at time 0 (reference time) when the level of control signal 161 changes from Low to High. Baseband modulating section 110 generates baseband signal 1 by modulating the transmission data using modulation scheme 1, and outputs generated baseband signal 1 to modulation signal selecting switch 120.

Next, timing control section 160 outputs control signal 162 level of which has been changed to High from Low to modulation signal selecting switch 120, in order to output baseband signal 1 to LPF 130-2. Timing control section 160 outputs control signal 162 level of which is changed from Low to High at time t1, to modulation signal selecting switch 120. Time t1 is time at which baseband signal 1 is output to modulation signal selecting switch 120 from baseband modulating section 110. In both cases of using modulation scheme 1 and using modulation scheme 2, baseband modulating section 110 adjusts the modulation timing in advance so that the baseband signal modulated using a modulation scheme to be used after switching in response to a reception of the switching instruction is output at time t1.

Modulation signal selecting switch 120 switches the output destination of the baseband signal from LPF 130-2 to LPF 130-1 at time 11 at which the level of control signal 162 changes from Low to High. Accordingly, after time 11, baseband signal 1 is output to LPF 130-1, and passes through path 1. Besides, between time 0 and time t1, baseband signal 2 is output to LPF 130-2, and passes through path 2.

In this way, timing control section 160 controls the output destination of baseband modulating section 110 at time t1 when the switching delay amount t1 has elapsed. Specifically, timing control section 160 switches the output destination of the baseband signal generated by baseband modulating section 110 to LPF 130-1 from LPF 130-2. Accordingly, baseband signal 1 is made to be output to LPF 130-1 at time t1. Then, baseband signal 1 is band-limited by LPF 130-1.

Next, timing control section 160 outputs control signal 163 level of which has been changed to High from Low to signal processing delay adjusting switch 140, in order to output band-limited baseband signal 1 to quadrature modulating section 151. Timing control section 160 outputs control signal 163 level of which changes from Low to High at time t2, to signal processing delay adjusting switch 140. As mentioned above, time t2 represents the time (t2=t1+Δtd1) when the period of delay amount Δtd1 has elapsed from time t1.

Signal processing delay adjusting switch 140 switches the input source of quadrature modulating section 151 from LPF 130-2 to LPF 130-1 at time t2 (=t1+Δtd1) at which the level of control signal 163 changes from Low to High. In other words, baseband signal 1 which is band-limited by LPF 130-1 is output to quadrature modulating section 151 after time t2 (=t1+Δtd1).

Besides, signal processing delay adjusting switch 140 sets LPF 130-2 as the input source of quadrature modulating section 151 between time 0 and time t2. Accordingly, baseband signal 2 which is band-limited by LPF 130-2 is output to quadrature modulating section 151 during this period.

In this way, signal processing delay adjusting switch 140 switches the input source of quadrature modulating section 151 from LPF 130-2 to LPF 130-1 at time t2. A time when baseband signal 1 which is band-limited by LPF 130-1 reaches quadrature modulating section 151 is time t2 (=t1+Δtd1). Accordingly, baseband signal 1 is input to quadrature modulating section 151 from LPF 130-1 after time t2 (refer to FIG. 4).

In this way, timing control section 160 switches the input source of quadrature modulating section 151 from LPF 130-2 to LPF 130-1 at time t2 (=t1+Δtd1). Specifically, timing control section 160 outputs control signal 163 level of which changes from Low to High at time t2 (=t1+Δtd1), to signal processing delay adjusting switch 140. As mentioned above, time t2 is the time based on delay amount Δtd1 of LPF 130-1.

Signal processing delay adjusting switch 140 switches the input source of quadrature modulating section 151 from LPF 130-2 to LPF 130-1 at time t2 (=t1+Δtd1). As mentioned above, time t2 is time when delay amount Δtd1 has elapsed from switching time t1 of modulation signal selecting switch 120. In this way, signal processing delay adjusting switch 140 switches the input source of quadrature modulating section 151 to LPF 130-1 corresponding to modulation scheme 1 which is used after the switching, at time t2 (=t1+Δtd1) based on time 0, time t1, and delay amount Δtd1. As mentioned above, time 0 is the switching time of the modulation scheme, time t1 is the switching time of modulation signal selecting switch 120, and delay amount Δtd1 is a smaller one among delay amounts Δtd1 and Δtd2.

Accordingly, in the case where the modulation scheme changes from modulation scheme 2 to modulation scheme 1, baseband signal 1 is continuously input into quadrature modulating section 151 following baseband signal 2. As a result, a null signal interval does not occur, and the loss of the transmission signal can be avoided. Besides, as mentioned above, the modulation bandwidth of modulation scheme 1 is wider than the modulation bandwidth of modulation scheme 2.

As having described above, in the present embodiment, baseband modulating section 110 is compatible with a plurality of modulation schemes different each other, and outputs one of modulation signals among a first modulation signal (the baseband signal 1) and a second modulation signal (the baseband signal 2). The first modulation signal is a modulation signal corresponding to modulation scheme 1, and the second modulation signal is a modulation signal corresponding to modulation scheme 2 modulation bandwidth of which is narrower than the modulation bandwidth of the first modulation signal.

LPF 130-1 performs signal processing on the first modulation signal. LPF 130-2 has a delay amount larger than the delay amount of LPF 130-1, and performs signal processing on a second modulation signal. Radio transmission processing section 150 transmits the first modulation signal or the second modulation signal, on which the signal processing has been performed. Modulation signal selecting switch 120 is provided between baseband modulating section 110, and LPFs 130-1 and 130-2, and outputs a modulation signal to one of LPF 130-1 and LPF 130-2.

Signal processing delay adjusting switch 140 is provided between LPFs 130-1 and 130-2, and radio transmission processing section 150, and outputs one of the first modulation signal and the second modulation signal, on which the signal processing has been performed, to radio transmission processing section 150.

Timing control section 160 sets the modulation scheme and the switching timing of the modulation scheme. Furthermore, timing control section 160 sets the switching timing of modulation signal selecting switch 120, and the switching timing of signal processing delay adjusting switch 140 to different timings. As mentioned above, modulation signal selecting switch 120 is a switch provided on a previous stage of LPFs 130-1 and 130-2 which have different delay amounts, and signal processing delay adjusting switch 140 is a switch provided on a subsequent stage of LPFs 130-1 and 130-2. Moreover, timing control section 160 sets the above-mentioned timings which are different each other based on the switching timing of the modulation scheme and delay amounts Δtd1 and Δtd2 of LPFs 130-1 and 130-2. More specifically, timing control section 160 sets switching timing t1 of modulation signal selecting switch 120 based on delay amount Δtd1 and delay amount Δtd2. Furthermore, timing control section 160 sets the above-mentioned timings which are different each other based on at least a first switch switching timing and delay amount Δtd1.

For example, it is presupposed that timing control section 160 switches the modulation scheme from modulation scheme 1 to modulation scheme 2. In this case, timing control section 160 sets the timing when period equal to or greater than delay amount Δtd1 of LPF 130-1, and less than delay amount Δtd2 of LPF 130-2 elapses from above-mentioned timing t1, as the switching timing of signal processing delay adjusting switch 140. Accordingly, in the case where the modulation scheme changes from modulation scheme 1 to modulation scheme 2, it is possible to avoid a duplicative input of the first modulation signal and the second modulation signal into quadrature modulating section 151. Besides, as mentioned above, modulation scheme 2 is a modulation scheme which has the modulation bandwidth narrower than the modulation bandwidth of modulation scheme 1.

Timing control section 160, in a case of switching the modulation scheme from modulation scheme 2 to modulation scheme 1, changes the switching timing of signal processing delay adjusting switch 140. Specifically, timing control section 160 sets the timing when period of delay amount Δtd1 of LPF 130-1 has elapsed from the switching timing of modulation signal selecting switch 120, as the switching timing of signal processing delay adjusting switch 140. By means of this, in the case where the modulation scheme changes from modulation scheme 2 to modulation scheme 1, the first modulation signal is continuously input into quadrature modulating section 151 following the second modulation signal, and therefore a null signal interval does not occur and the loss of the transmission signal can be avoided. Besides, as mentioned above, the modulation bandwidth of modulation scheme 1 is wider than the modulation bandwidth of modulation scheme 2.

Embodiment 2

Figure 5:
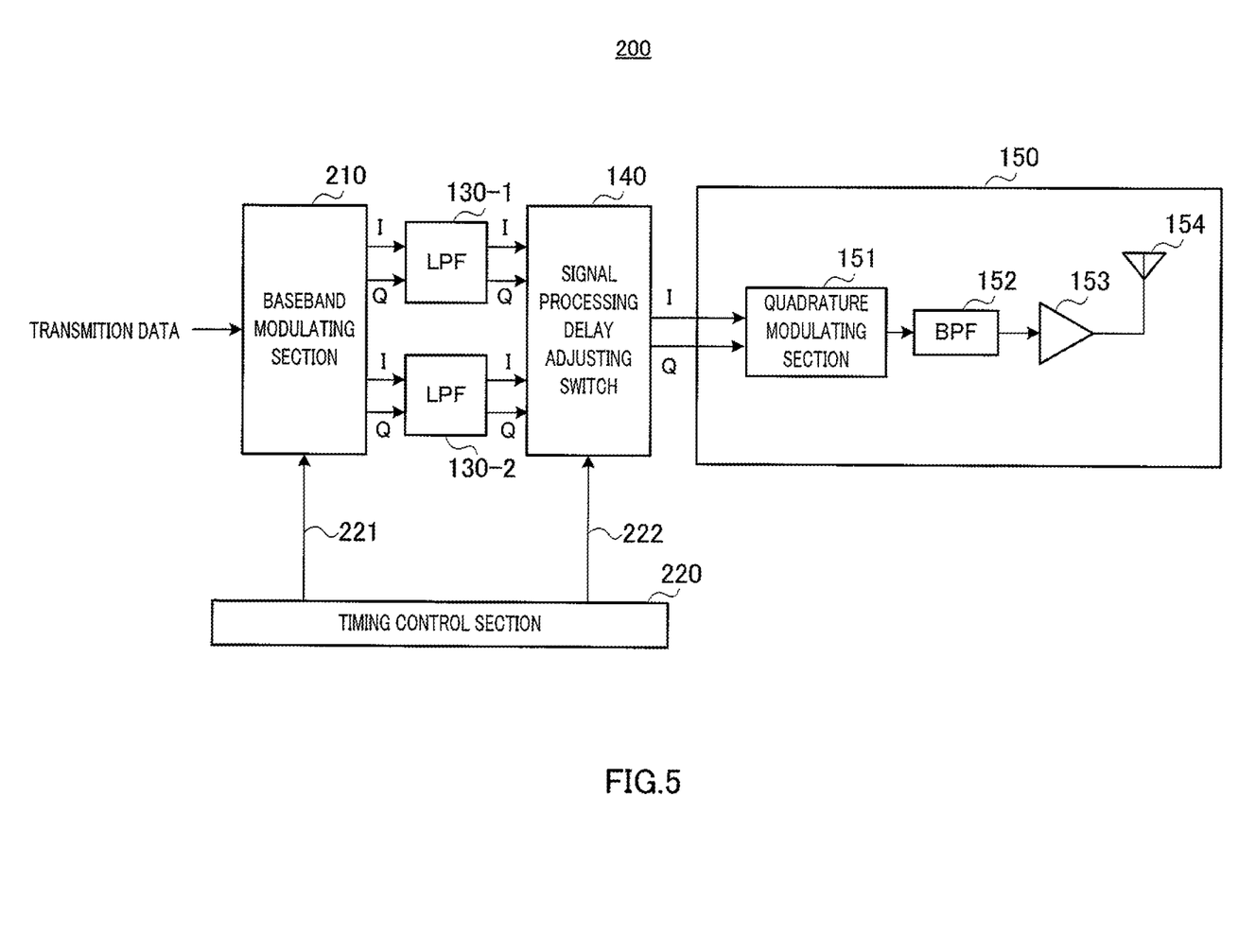
FIG. 5 is a schematic diagram of a multimode transmitter apparatus according to Embodiment 2 of the present invention.

FIG. 5 is a block diagram illustrating a principal part configuration of multimode transmitter apparatus 200 according to Embodiment 2 of the present invention. With respect to the components of the multimode transmitter apparatus according to the present embodiment of FIG. 5, which are in common with components in FIG. 2, the symbols same as those in FIG. 2 are given to the components and description for the components are omitted.

Multimode transmitter apparatus 200 of FIG. 5 does not include modulation signal selecting switch 120 in comparison with multimode transmitter apparatus 100 of FIG. 2. Moreover, multimode transmitter apparatus 200 of FIG. 5 includes baseband modulating section 210 and timing control section 220, instead of baseband modulating section 110 and timing control section 160 of FIG. 2.

Baseband modulating section 210 is compatible with a plurality of modulation schemes (modulation scheme 1 and modulation scheme 2). Baseband modulating section 210 modulates the transmission data, and generates baseband signals (I/Q signals) in accordance with control signal 221 output from timing control section 220 as described below.

In Embodiment 1, baseband modulating section 110 outputs one of baseband signal 1 and baseband signal 2. On the other hand, baseband modulating section 210 of the present embodiment generates in parallel baseband signal 1 corresponding to modulation scheme 1, and baseband signal 2 corresponding to modulation scheme 2. Baseband modulating section 210 outputs only one of baseband signal 1 and baseband signal 2 in one case, and outputs the both baseband signal 1 and baseband signal 2 in another case. In this way, baseband modulating section 210 outputs at least one of baseband signal 1 and baseband signal 2 to signal processing delay adjusting switch 140. Baseband modulating section 210 outputs the baseband signal generated using modulation scheme 1 to LPF 130-1, and outputs the baseband signal corresponding to modulation scheme 2 to LPF 130-2.

Timing control section 220 controls the modulation scheme of baseband modulating section 210, and signal processing delay adjusting switch 140.

Specifically, timing control section 220 outputs control signal 221 which indicates the modulation scheme and switching timing of the modulation scheme to baseband modulating section 210. Control signal 221 is described below.

Furthermore, timing control section 220 outputs control signal 222, which indicates a switching of the input source of quadrature modulating section 151 and switching timing of the input source, to signal processing delay adjusting switch 440. Control signal 222 is described below.

An operation of multimode transmitter apparatus 200 constituted as mentioned above will be described.

Figure 6:
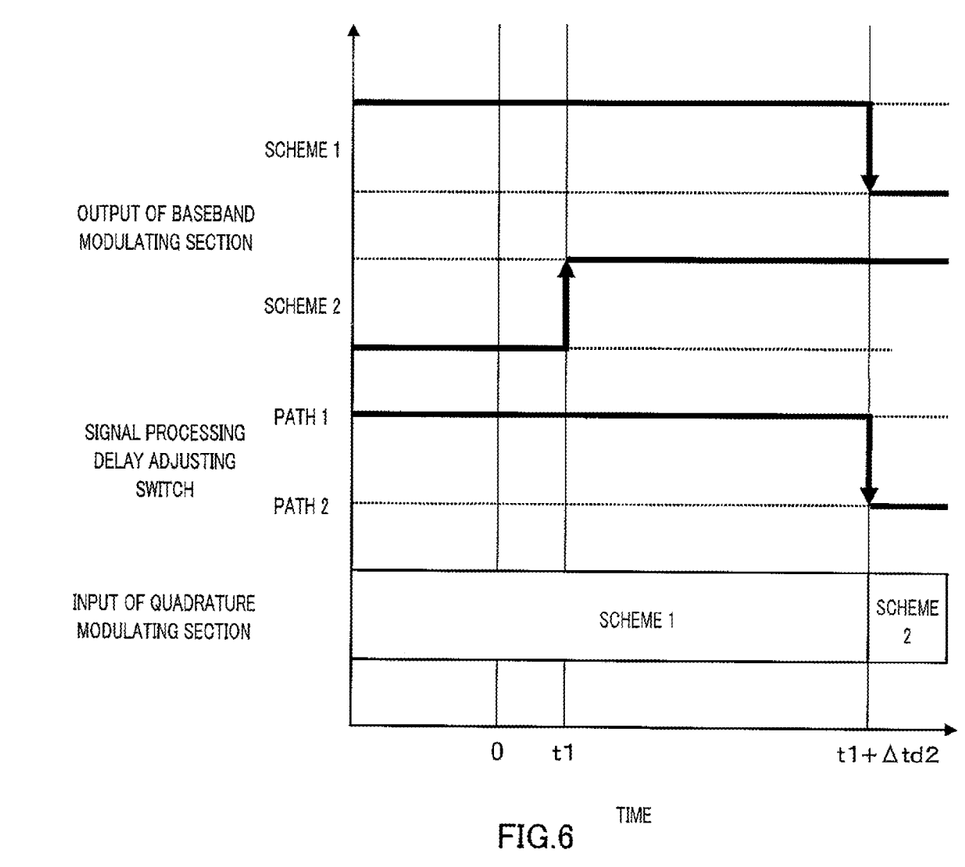
FIG. 6 is a control timing chart of the multimode transmitter apparatus according to Embodiment 2.
Figure 7:
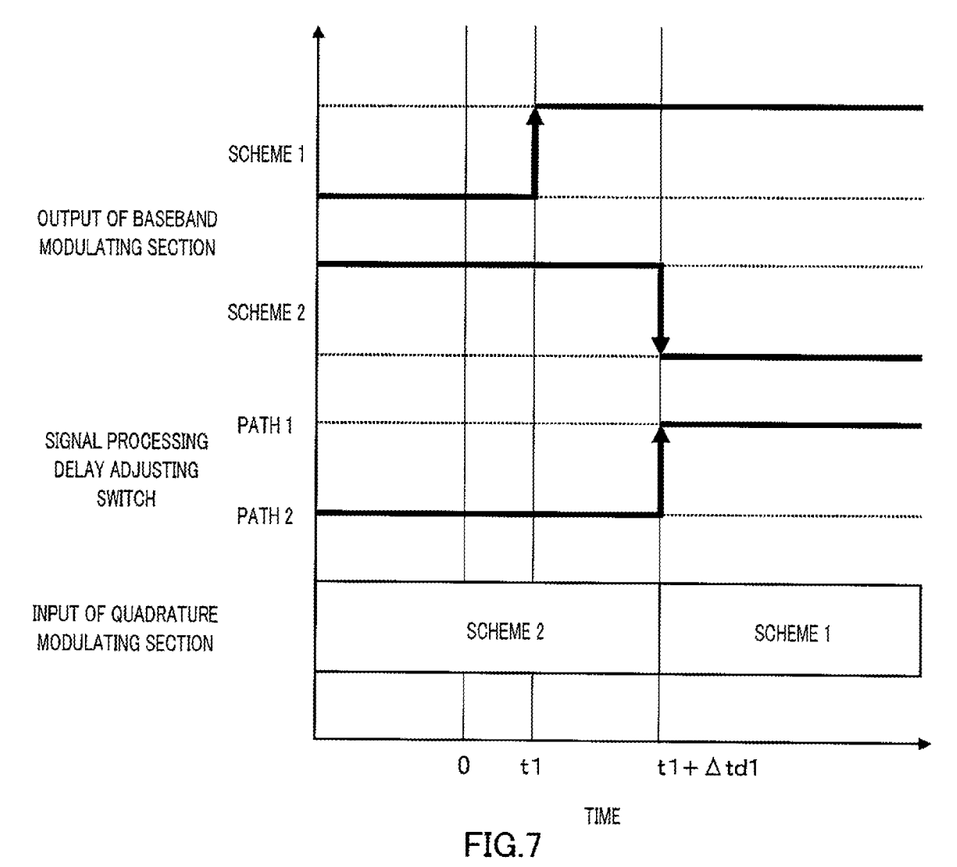
FIG. 7 is a control timing chart of the multimode transmitter apparatus according to Embodiment 2.

FIG. 6 and FIG. 7 are drawings illustrating input and output signals of each part of multimode transmitter apparatus 200 according to the present embodiment.

FIG. 6 and FIG. 7 illustrate an output of baseband modulating section 210, a path selected by signal processing delay adjusting switch 140, and the modulation signal input into quadrature modulating section 151. As mentioned above, in FIG. 6 and FIG. 7, path 1 indicates the path along which the baseband signal passes through LPF 130-1, and path 2 indicates the path along which the baseband signal passes through LPF 130-2.

FIG. 6 illustrates an exemplary case of changing the modulation scheme from modulation scheme 1 to modulation scheme 2, and FIG. 7 illustrates an exemplary case of changing the modulation scheme from modulation scheme 2 to modulation scheme 1. As mentioned above, in FIG. 6 and FIG. 7, path 1 indicates the path along which the baseband signal passes through LPF 130-1, and path 2 indicates the path along which the baseband signal passes through LPF 130-2.

In this embodiment, it is assumed that the modulation schemes with which baseband modulating section 210 is compatible are two kinds, that is, the UMTS modulation scheme (hereinafter, modulation scheme 1) and the GSM modulation scheme (hereinafter, modulation scheme 2), as a specific example, LPF 130-1 has a frequency characteristic corresponding to modulation scheme 1, and LPF 130-2 has a frequency characteristic corresponding to modulation scheme 2. Hereinafter, an operation in this case will be described.

First, a control method in a case of switching the modulation scheme from modulation scheme 1 to modulation scheme 2 will be described with reference to FIG. 6. As mentioned above, since the modulation bandwidth of modulation scheme 1 is wider than the modulation bandwidth of modulation scheme 2, delay amount $\Delta td1$ of LPF 130-1 is smaller than delay amount $\Delta td2$ of LPF 130-2.

Timing control section 220 outputs control signal 221 level of which has been changed to Low from High to baseband modulating section 210, in a case of switching the modulation scheme from modulation scheme 1 to modulation scheme 2. FIG. 6 illustrates an example in which control signal 221 is output to baseband modulating section 210 from timing control section 220, level of control signal being changed to Low from High at time 0 (hereinafter, referred to as "reference time").

When baseband modulating section 210 receives control signal 221 level of which changes from High to Low at time 0 (reference time), baseband modulating section 210 generates in parallel baseband signal 1 corresponding to modulation scheme 1, and baseband signal 2 corresponding to modulation scheme 2. In other words, baseband modulating section 210 generates baseband signal 2 in addition to baseband signal 1, when receiving the switching instruction at time 0 (reference time). Then, baseband modulating section 210 outputs generated baseband signal 1 to LPF 130-1, and outputs generated baseband signal 2 to LPF 130-2.

In the present embodiment, the period required for baseband modulating section 210 from time 0 till when outputting generated baseband signal 2 to LPF 130-2 is represented by t1.

Baseband modulating section 210, when using modulation scheme 1, modulates the transmission data at the timing in consideration of a difference ($\Delta td2 - \Delta td1$) of the delay amounts of LPF 130-1 and LPF 130-2, to the case where modulation scheme 2 is used. Specifically, in both cases of using modulation scheme 1 and using modulation scheme 2, baseband modulating section 210 adjusts the modulation timing in advance so that the baseband signal modulated using a modulation scheme to be used after switching is output at time t1. Therefore, the baseband signal after switching is output from baseband modulating section 210 at time t1 when t1 has elapsed from time 0.

In other words, baseband modulating section 210 outputs only baseband signal 1 till time t1, and outputs baseband signal 2 in addition to baseband signal 1 after time t1. In this way, baseband modulating section 210 switches the number of the baseband signals to output after time t1 from 1 to 2, time t1 being time when time t1 has elapsed from time 0. As mentioned above, baseband modulating section 210 adjusts the modulation timing in advance so that the baseband signal after switching is output from baseband modulating section 210 at time t1 when t1 has elapsed from time 0.

In this way, time t1 represents timing when the number of baseband signals output from baseband modulating section 210 (output number) is switched to 2 from 1 (hereinafter, also referred to as "modulation signal output number change timing"). As mentioned above, time t1 is the time when time t1 has elapsed from the switching timing (time 0) of the modulation scheme. Therefore, setting the switching timing of the modulation scheme is equivalent to a setting of the modulation signal output number change timing.

Baseband signal 1 is band-limited by LPF 130-1, and baseband signal 2 is band-limited by LPF 130-2. Baseband signal 1 and baseband signal 2, which are band-limited, are output to signal processing delay adjusting switch 140.

Next, timing control section 220 outputs control signal 222 level of which has been changed to Low from High to signal processing delay adjusting switch 140, in order to output band-limited baseband signal 2 to quadrature modulating section 151. Timing control section 220 outputs control signal 222 level of which changes from High to Low at time t3, to signal processing delay adjusting switch 140. Here, time t3 represents the time (t3=t1+Δtd2) when the period of delay amount Δtd2 has elapsed from time t1. In other words, time t3 is time based on delay amount Δtd2 of LPF 130-2. Delay amount Δtd2 is a period from when baseband signal 2 is input into LPF 130-2 till when baseband signal 2 is output from LPF 130-2. In other words, delay amount Δtd2 is a delay amount in LPF 130-2.

Signal processing delay adjusting switch 140 switches the input source of quadrature modulating section 151 from LPF 130-1 to LPF 130-2 at time t3 (=t1+Δtd2) when the level of control signal 222 changes from High to Low. In other words, baseband signal 2 which is band-limited by LPF 130-2 is output to quadrature modulating section 151 after time t3 (=t1+Δtd2).

Baseband modulating section 210 outputs baseband signal 1 between time 0 and time t3. Moreover, signal processing delay adjusting switch 140 sets the input source of quadrature modulating section 151 to LPF 130-1 between time 0 and time t3. Accordingly, baseband signal 1 which is band-limited by LPF 130-1 is output to quadrature modulating section 151 during this period.

In this way, signal processing delay adjusting switch 140 switches the input source of quadrature modulating section 151 from LPF 130-1 to LPF 130-2 at time t3. A time when baseband signal 2 which is band-limited by LPF 130-2 reaches quadrature modulating section 151 is time t3 (=t1+Δtd2). Here, Δtd2 is the delay amount of LPF 130-2.

In Embodiment 1, the null signals are input into quadrature modulating section 151 from LPF 130-2 from time t2 till time t3. On the other hand, in the present embodiment, baseband modulating section 210 outputs both baseband signal 1 and baseband signal 2 between time t1 and time t3. Therefore, baseband signal 1 is input into quadrature modulating section 151 from LPF 130-1 till time t3. Then, baseband signal 2 is input into quadrature modulating section 151 from LPF 130-2 after time t3 (refer to FIG. 6). In other words, there is no section in which the null signals are input in the present embodiment.

In this way, timing control section 220 switches the input source of quadrature modulating section 151 from LPF 130-1 to LPF 130-2 at time t3 (=t1+Δtd2). Specifically, timing control section 220 outputs control signal 222 level of which changes from High to Low at time t3 (=t1+Δtd2), to signal processing delay adjusting switch 140.

Signal processing delay adjusting switch 140 switches the input source of quadrature modulating section 151 from LPF 130-1 to LPF 130-2 at time t3 (=t1+Δtd2). Here, time t1 is time when baseband signal 2 is output to LPF 130-2 after receiving the switching instruction of the modulation scheme. In this way, signal processing delay adjusting switch 140 switches the input source of quadrature modulating section 151 to LPF 130-2 corresponding to modulation scheme 2 which is used after the switching, at time t3 (=t1+Δtd2) based on time 0, time t1, and delay amount Δtd2. As mentioned above, time 0 is the switching time of the modulation scheme, time t1 is the switching time of modulation signal selecting switch 120, and delay amount Δtd2 is a larger one among delay amounts Δtd1 and Δtd2.

Accordingly, in the case where the modulation scheme changes from modulation scheme 1 to modulation scheme 2 of which the modulation bandwidth is narrower than the modulation bandwidth of modulation scheme 1, it is possible to avoid a duplicative input of baseband signal 1 and baseband signal 2 to quadrature modulating section 151.

The baseband signal output from signal processing delay adjusting switch 140 is up-converted to be the transmission signal with RF band by quadrature modulating section 151, and is band-limited by BPF 152. After that, the up-converted and band-limited signal is amplified so that the power of the signal becomes desired output power by power amplifier 153, and is transmitted from transmission antenna 154.

Next, a control method in a case of switching the modulation scheme from modulation scheme 2 to modulation scheme 1 will be described with reference to FIG. 7.

Timing control section 220 outputs control signal 221 level of which has been changed to High from Low, to baseband modulating section 210, when switching the modulation scheme from modulation scheme 2 to modulation scheme 1. FIG. 7 illustrates an example in which control signal 221 level of which is changed to High from Low at time 0 (reference time) is output to baseband modulating section 210 from timing control section 220.

When baseband modulating section 210 receives control signal 221 level of which changes from Low to High at time 0 (reference time), baseband modulating section 210 generates in parallel baseband signal 1 corresponding to modulation scheme 1, and baseband signal 2 corresponding to modulation scheme 2. In other words, baseband modulating section 210 generates baseband signal 1 in addition to baseband signal 2, when receiving the switching instruction at time 0 (reference time). Then, baseband modulating section 210 outputs generated baseband signal 1 to LPF 130-1, and outputs generated baseband signal 2 to LPF 130-2. Then, baseband signal 1 is band-limited by LPF 130-1, and baseband signal 2 is band-limited by LPF 130-2.

Next, timing control section 220 outputs control signal 222 level of which has been changed from Low to High to signal processing delay adjusting switch 140, in order to output band-limited baseband signal 1 to quadrature modulating section 151. Timing control section 220 outputs control signal 222 level of which changes from Low to High at time t2, to signal processing delay adjusting switch 140. As mentioned above, time t2 represents the time (t2=t1+Δtd1) when the period of delay amount Δtd1 has elapsed from the time t1.

Signal processing delay adjusting switch 140 switches the input source of quadrature modulating section 151 from LPF 130-2 to LPF 130-1 at time t2 at which the level of control signal 222 changes from Low to High. In other words, baseband signal 1 which is band-limited by LPF 130-1 is output to quadrature modulating section 151 after time t2 (=t1+Δtd1).

Baseband modulating section 210 outputs baseband signal 2 between time 0 and time t2. Moreover, signal processing delay adjusting switch 140 sets the input source of quadrature modulating section 151 to LPF 130-2 between time 0 and time t2. Accordingly, baseband signal 2 which is band-limited by LPF 130-2 is output to quadrature modulating section 151 during this period.

In this way, signal processing delay adjusting switch 140 switches the input source of quadrature modulating section 151 from LPF 130-2 to LPF 130-1 at time t2. A time when baseband signal 1 which is band-limited by LPF 130-1 reaches quadrature modulating section 151 is time t2 (=t1+Δtd1). In other words, baseband signal 2 is input into quadrature modulating section 151 from LPF 130-2 till time t2. Then, baseband signal 1 is input into quadrature modulating section 151 from LPF 130-1 after time t2 (refer to FIG. 7).

In this way, timing control section 220 switches the input source of quadrature modulating section 151 from LPF 130-2 to LPF 130-1 at time t2 (=t1+Δtd1). Specifically, timing control section 220 outputs control signal 222 level of which changes from Low to High at time t2 (=t1+Δtd1), to signal processing delay adjusting switch 140. As mentioned above, time t2 is the time based on delay amount Δtd1 of LPF 130-1.

Signal processing delay adjusting switch 140 switches the input source of quadrature modulating section 151 from LPF 130-2 to LPF 130-1 at time t2 (=t1+Δtd1). As mentioned above, time t2 is the time when delay amount Δtd1 has elapsed from switching time t1 of modulation signal selecting switch 120. In this way, signal processing delay adjusting switch 140 switches the input source of quadrature modulating section 151 to LPF 130-1 corresponding to modulation scheme 1 which is used after the switching, at time t2 (=t1+Δtd1) based on time 0, time t1, and delay amount Δtd1. As mentioned above, time 0 is the switching time of the modulation scheme, time t1 is the switching time of modulation signal selecting switch 120, and delay amount Δtd1 is a smaller one among delay amounts Δtd1 and Δtd2.

By means of this, in the case where the modulation scheme changes from modulation scheme 2 to modulation scheme 1, baseband signal 1 is continuously input into quadrature modulating section 151 following baseband signal 2. Besides, as mentioned above, the modulation bandwidth of modulation scheme 1 is wider than the modulation bandwidth of modulation scheme 2. As a result, a null signal section does not occur and the loss of the transmission signal can be avoided.

In the above-mentioned description, a case is described in which timing control section 220 outputs control signal 222 level of which changes from Low to High at time t2 (=t1+Δtd1) to signal processing delay adjusting switch 140, but it is not limited to this manner. Timing control section 220 may output control signal 222 level of which changes from Low to High in a period after time t2 (=t1+Δtd1) till time t3 (=t1+Δtd2) to signal processing delay adjusting switch 140. For example, timing control section 220 outputs control signal 222 level of which changes from Low to High at time t3 to signal processing delay adjusting switch 140. In this case, the switching timings can be unified regardless a switching direction of the modulation scheme. As a result, timing control section 220 can use the identical control signal 222 regardless the switching direction, and therefore it is possible to suppress the process required for the generation of the control signal.

As having described above, in the present embodiment, baseband modulating section 210 is compatible with a plurality of modulation schemes different each other. Baseband modulating section 210 generates a first modulation signal (baseband signal 1) and a second modulation signal (baseband signal 2) in parallel, and outputs at least one of the modulation signals. The first modulation signal is a modulation signal corresponding to modulation scheme 1, and the second modulation signal is a modulation signal corresponding to modulation scheme 2 modulation bandwidth of which is narrower than the modulation bandwidth of the first modulation signal.

LPF 130-1 performs signal processing on the first modulation signal. LPF 130-2 has a delay amount larger than the delay amount of LPF 130-1, and performs signal processing on a second modulation scheme. Radio transmission processing section 150 transmits the first modulation signal or the second modulation signal, on which the signal processing has been performed.

Signal processing delay adjusting switch 140 is provided between LPFs 130-1 and 130-2 the delay amounts of which are different each other, and radio transmission processing section 150. Signal processing delay adjusting switch 140 outputs one of the first modulation signal and the second modulation signal, on which the signal processing has been performed, to radio transmission processing section 150.

Timing control section 220 sets the modulation scheme, and sets the switching timing of the modulation scheme based on delay amounts Δtd1 and Δtd2 of LPFs 130-1 and 130-2. As mentioned above, when the switching timing (time 0) of the modulation scheme is set, timing control section 220 sets the timing at which the number of baseband signals (the number of outputs) is switched from 1 to 2, baseband signals being output from baseband modulating section 210. In other words, the modulation signal output number change timing is set to timing control section 220. Specifically, the modulation signal output number change timing is set based on delay amounts Δtd1 and Δtd2 of LPFs 130-1 and 130-2.

Furthermore, timing control section 220 sets the switching timing of signal processing delay adjusting switch 140 based on the switching timing of the modulation scheme, and one of delay amounts Δtd1 and Δtd2 of LPFs 130-1 and 130-2. The switching timing of the modulation scheme is, in other words, the modulation signal output number change timing.

For example, it is presupposed that timing control section 220 switches the modulation scheme from modulation scheme 1 to modulation scheme 2. In this case, timing control section 220 sets a given timing on the basis of the timing at which the second modulation signal is output from baseband modulating section 210, as the switching timing of signal processing delay adjusting switch 140. This given timing is timing when the period of delay amount Δtd2 of LPF 130-2 has elapsed from the timing at which the second modulation signal is output from baseband modulating section 210. Accordingly, in the case where the modulation scheme changes from modulation scheme 1 to modulation scheme 2, it is possible to avoid a duplicative input of the first modulation signal and the second modulation signal into quadrature modulating section 151. Besides, as mentioned above, modulation scheme 2 is a modulation scheme which has the modulation bandwidth narrower than the modulation bandwidth of modulation scheme 1.

On the other hand, it is presupposed that timing control section 220 switches the modulation scheme from the second modulation scheme to the first modulation scheme. In this case, timing control section 220 sets a given timing on the basis of the timing at which the first modulation signal is output from baseband modulating section 210, as the switching timing of signal processing delay adjusting switch 140. The given timing is timing when the period equal to or greater than delay amount Δtd1 of LPF 130-1 and less than delay amount Δtd2 of LPF 130-2 has elapsed from the timing at which the first modulation signal is output from baseband modulating section 210. By means of this, in the case where the modulation scheme changes from modulation scheme 2 to modulation scheme 1 the modulation bandwidth of which is wider than the modulation bandwidth of modulation scheme 2, the first modulation signal is continuously input into quadrature modulating section 151 following the second modulation signal. As a result, a null signal section does not occur and the loss of the transmission signal can be avoided in the present embodiment.

The above-mentioned description has described a case in which baseband modulating sections 110 and 210 operate in the baseband bandwidth. In this case, since modulation signal selecting switch 120 and signal processing delay adjusting switch 140 handle the signal in the baseband bandwidth, characteristic degradation can be suppressed in modulation signal selecting switch 120 and signal processing delay adjusting switch 140.

Moreover, the present invention can be applied in the case where baseband modulating sections 110 and 210 operate in RF band. In this case, an entire delay amount of multimode transmitter apparatuses 100, 200 can be adjusted.

Moreover, the above-mentioned description has described a case in which the path is switched from path 1 to path 2 when the level of the switching signal changes from High to Low, but the present invention is not limited to this case. The multimode transmitter apparatus may switch the path from path 1 to path 2 when the level of the switching signal changes from Low to High.

The above-mentioned description has described a case in which the first modulation scheme is the UMTS modulation and the second modulation scheme is the GSM modulation as an example, but it is not limited to this case and other modulation schemes may be used. Moreover, baseband modulating sections 110 and 210 are compatible with two kinds of modulation schemes, but three or more kinds may be employed.

Moreover, the above-mentioned description has described an exemplary case in which there are a difference between the delay amount of path 1 along which the baseband signal passes through LPF 130-1 and the delay amount of path 2 along which the baseband signal passes through LPF 130-2, due to the difference of the delay amounts of LPFs 130-1 and 130-2. However, the present invention can be applied to a signal processing section other than LPFs 130-1 and 130-2, in the case where the signal processing section affects the delay amount between path 1 and path 2.

The entire disclosure of specification, drawings and abstract of Japanese Patent Application No. 2010-200918 filed on Sep. 8, 2010 is incorporated by references herein.

INDUSTRIAL APPLICABILITY

The multimode transmitter apparatus according to the present invention is useful as a multimode transmitter apparatus or the like, which performs signal processing on a plurality of signals on which digital signal processing are performed in a plurality of paths having delay amounts which are different each other.

REFERENCE SIGNS LIST 100, 200 Multimode transmitter apparatus
110, 210 Baseband modulating section
120 Modulation signal selecting switch
130-1, 130-2 Low pass filter (LPF)
140 Signal processing delay adjusting switch
150 Radio transmission processing section
151 Quadrature modulating section
152 Band pass filter (BPF)
153 Power amplifier
154 Antenna
160, 220 Timing control section

The invention claimed is:

1. A multimode transmitter apparatus comprising:
a modulating section that is compatible with a plurality of modulation schemes different each other and generates one of a first modulation signal corresponding to a first modulation scheme and a second modulation signal corresponding to a second modulation scheme;
a first signal processing section that has a first delay amount and performs signal processing on the first modulation signal;
a second signal processing section that has a second delay amount larger than the first delay amount and performs signal processing on the second modulation signal;
a transmitting section that transmits the first modulation signal and the second modulation signal, on which the signal processing have been performed;
a first switch that is provided between the modulating section, and the first and the second signal processing sections, and outputs the modulation signal to one of the first and the second signal processing sections;
a second switch that is provided between the first and the second signal processing sections, and the transmitting section, and outputs one of the first modulation signal and the second modulation signal, on which the signal processing has been performed, to the transmitting section; and
a control section that sets a modulation scheme used for generating the modulation signal in the modulating section, sets switching timing of the first switch based on the first delay amount and the second delay amount, and sets switching timing of the second switch different from the switching timing of the first switch based on at least the switching timing of the first switch and the first delay amount.

2. The multimode transmitter apparatus according to claim 1, wherein
the control section, in a case of switching the modulation scheme from the first modulation scheme to the second modulation scheme, sets the timing when period equal to or greater than the first delay amount and less than the second delay amount elapses from the switching timing of the first switch, as the switching timing of the second switch.

3. The multimode transmitter apparatus according to claim 1, wherein
the control section, in a case of switching the modulation scheme from the second modulation scheme to the first modulation scheme, sets the timing when the first delay amount elapses from the switching timing of the first switch, as the switching timing of the second switch.

4. The multimode transmitter apparatus according to claim 1, wherein the modulating section operates in a baseband bandwidth.

5. The multimode transmitter apparatus according to claim 1, wherein
a plurality of the signal processing sections are filter circuits of which passbands are different, and perform band limitation on the first modulation signal or the second modulation signal.

6. The multimode transmitter apparatus according to claim 1, wherein the modulating section operates in a radio frequency band.

7. The multimode transmitter apparatus according to claim 1, wherein the first modulation signal is a UMTS signal and the second modulation signal is a GSM signal.

8. A multimode transmitter apparatus comprising:
a modulating section that is compatible with a plurality of modulation schemes different each other and generates a first modulation signal corresponding to a first modulation scheme and a second modulation signal corresponding to a second modulation scheme in parallel, and outputs at least one of the first and the second modulation signals;
a first signal processing section that has a first delay amount and performs signal processing on the first modulation signal;
a second signal processing section that has a second delay amount larger than the first delay amount and performs signal processing on the second modulation signal;
a transmitting section that transmits the first modulation signal and the second modulation signal, on which the signal processing have been performed;
a switch that is provided between the first and the second signal processing sections, and the transmitting section, and outputs one of the first modulation signal and the second modulation signal, on which the signal processing have been performed, to the transmitting section; and
a control section that sets a modulation scheme used for generating the modulation signal in the modulating section, sets modulation signal output number change timing at which an output of the modulating section is switched from one of the first modulation signal and the second modulation signal to both of the first modulation signal and the second modulation signal based on the first delay amount and the second delay amount, and sets switching timing of the switch based on one of the first delay amount and the second delay amount, and the modulation signal output number change timing.

9. The multimode transmitter apparatus according to claim 8, wherein
the control section, in a case of switching the modulation scheme from the first modulation scheme to the second modulation scheme, sets the timing when the second delay amount elapses from the modulation signal output number change timing, as the switching timing of the switch.

10. The multimode transmitter apparatus according to claim 8, wherein
the control section, in a case of switching the modulation scheme from the second modulation scheme to the first modulation scheme, sets the timing when the first delay amount elapses from the modulation signal output number change timing, as the switching timing of the switch.

11. The multimode transmitter apparatus according to claim 8, wherein the modulating section operates in a baseband bandwidth.

12. The multimode transmitter apparatus according to claim 8, wherein
a plurality of the signal processing sections are filter circuits of which passbands are different, and
performed band limitation on the first modulation signal or the second modulation signal.

13. The multimode transmitter apparatus according to claim 8, wherein the modulating section operates in a radio frequency band.

14. The multimode transmitter apparatus according to claim 8, wherein the first modulation signal is a UMTS signal, and the second modulation signal is a GSM signal.

* * * * *